United States Patent [19]
Kim

[11] Patent Number: 6,137,482
[45] Date of Patent: Oct. 24, 2000

[54] POSITION SENSIBLE LIQUID CRYSTAL DISPLAY DEVICE

[75] Inventor: Jun Hee Kim, Seoul, Rep. of Korea

[73] Assignee: LG Electronics Inc., Seoul, Rep. of Korea

[21] Appl. No.: 08/992,669

[22] Filed: Dec. 17, 1997

[30]        Foreign Application Priority Data

Dec. 23, 1996  [KR]  Rep. of Korea ...................... 96 70363

[51] Int. Cl.$^7$ ...................................................... G09G 5/00

[52] U.S. Cl. ........................... 345/179; 345/178; 345/104

[58] Field of Search .................................... 345/179, 100,
345/104, 101, 94, 103, 178; 178/19.03;
349/34; 714/813

[56]              References Cited

U.S. PATENT DOCUMENTS

| 4,661,957 | 4/1987 | Okuhara | 714/813 |
| 5,353,135 | 10/1994 | Edwards | 349/34 |
| 5,654,529 | 8/1997 | Yeung et al. | 178/19.03 |
| 5,847,690 | 12/1998 | Boie et al. | 345/104 |

*Primary Examiner*—Steven J. Saras
*Assistant Examiner*—Fritz Alphonse
*Attorney, Agent, or Firm*—Finnegan, Henderson, Farabow, Garrett & Dunner, L.L.P.

[57]              ABSTRACT

A position sensible liquid crystal display (PSLCD) device capable of automatically compensating for potential distribution distortions in a driving signal has a signal correcting part disposed between a switching part and the position sensing substrate for adjusting the driving signal to correct for the potential distribution distortions. The position sensing function is performed using a black matrix grid in the substrate.

17 Claims, 7 Drawing Sheets

POSITION SENSIBLE LIQUID CRYSTAL DISPLAY DEVICE

BACKGROUND OF THE INVENTION

1. Field of the Invention

The present invention relates to a position sensible liquid crystal display device, and more particularly, to a position sensible liquid crystal display (PSLCD) device suitable for automatic compensation of potential distribution distortions of a driving signal.

2. Discussion of the Related Art

In general, as shown in FIG. 1, a liquid crystal display (LCD) device includes an upper plate 3, a lower plate 1, and a liquid crystal sealed between the upper and lower plates. The upper plate 3 has a common electrode 6, a layer of black matrix 4, and a layer of R (red), G (green), and B (blue) color filters 5 that filter light to generate colors. The lower plate has a plurality of data lines and scanning lines arranged at right angles to each other and spaced at fixed intervals to form a matrix of pixel regions. Each of the pixel regions has a thin film transistor and a pixel electrode. More particularly, lower plate 1 has thin film transistors 2 disposed thereon at fixed intervals, each with a gate electrode G corresponding to a scanning line, a source electrode S, and a drain electrode D (corresponding to a data line). Each of the pixel regions has a pixel electrode 2a connected to the drain electrode D of the thin film transistor 2. Black matrix 4 on the upper plate 3 blocks light in sections other than pixel electrodes 2a, which corresponds to the R, G, and B color filters 5. Upon selective application of driving signals from external driving circuits to the scanning lines and the data lines, the LCD device displays an image.

A conventional PSLCD device will be explained with reference to the attached drawings. FIG. 2 is a plan view of an upper plate of the conventional PSLCD. A conventional PSLCD device includes color filters, a common electrode of an ITO layer, and, as explained below, the black matrix. As shown in FIG. 2, the black matrix in the conventional PSLCD includes first black matrix elements 21 connected in vertical and horizontal directions in a grid arrangement. Second black matrix elements (not shown in FIG. 2) are used to block light to portions other than the pixel regions between black matrix elements 21. Black matrix 21 has a plurality of equipotential compensating resistors 22 connected and extending in each direction (directions of the data lines and the scanning lines), and the equipotential compensating resistors 22 of the same direction are connected to an equipotential maintaining resistor 23. Typically, not every pixel has matrix element 21 opposite to it, but instead, multiple pixels may be between a single line of black matrix grid 21. Lines of the first black matrix element 21, connected in series in X-axis direction, are called the X-axis grid and lines of the first black matrix element 21, connected in series in the Y-axis direction, are called a Y-axis grid. A driving signal for detecting X- and Y-axis coordinates of a stylus are applied through the first black matrix elements 21 connected in series, i.e., through the X- and Y-axes grids. The equipotential maintaining resistors 23 are provided at four sides of the PSLCD device, and a driving AC signal applying part 24 is provided at each of four corners of the PSLCD where the equipotential maintaining resistors 23 at the four sides are met for applying the driving AC signal.

FIG. 3 is a circuit diagram illustrating a driving signal applying device for applying a driving signal for detecting position in the conventional PSLCD device. As shown, the driving signal applying device includes an analog switching part 31 and buffer sections 32 that apply either a driving AC signal or a grounding signal to the corner applying areas.

The operation of the aforementioned conventional PSLCD device will now be explained.

Referring to FIGS. 2 and 3, in order to apply a driving AC signal to the X- and Y-axis grids of black matrix elements for position detection, a microcontroller selects appropriate driving signal applying areas 24 to apply the driving AC signal and a grounding signal, and operates analog switch 31 accordingly. The analog switch has a driving AC signal terminal and a ground terminal, either of which may be selected in response to selecting signals from the microcontroller. The selected driving AC signal or the grounding signal is provided to the driving signal applying area 24 through buffer amplifying parts 32.

Deviations in the signal line resistances, through which the AC signal is applied, results in unequal voltage drops in the X and Y axis directions, and thus causes a deterioration in performance.

In particular, the equipotential compensating resistors 22, equipotential maintaining resistors 23, and supplementary resistors have deviations in their performances from intended performances due to process errors; and the instances of contact elements between the lower plate through the upper plate are not identical due to irregularities in bonding.

Thus, the application of the driving signal and the grounding signal to the driving signal applying area, without any adjustment in the applied signals, results in signal distortion and corresponding degradation in position detection.

SUMMARY OF THE INVENTION

Accordingly, the present invention is directed to a method for driving a PSLCD device that substantially obviates one or more of the limitations and disadvantages of the related art.

An object of the present invention is to provide a PSLCD device that controls a driving AC signal and a grounding signal to compensate for signal distortions occurring due to resistance variations caused by process errors and bonding irregularities between the upper and lower plates.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a position sensible liquid crystal display device consistent with the present invention uses a black matrix as a position sensing means and includes a position sensible liquid crystal panel for sensing a position of a stylus thereon based on a driving AC signal provided thereto, a driving signal generating part for generating the driving AC signal, and a driving signal applying part for receiving the driving AC signal from the driving signal generating part, compensating for distortion in the driving AC signal, and applying the driving AC signal to the position sensible liquid crystal panel.

Consistent with a second embodiment of the present invention, a position sensible liquid crystal display device uses a black matrix as a position sensing means and includes: a microcomputer, a first substrate having a plurality of gate lines, data lines, thin film transistors, and pixels arranged thereon; a second substrate having first and second grids of the black matrix arranged thereon; a switching part under the control of the microcomputer for selecting driving signals and grounding signals to be applied to the black matrix of the second substrate; and a signal correcting part connected between the switching part and the second substrate for adjusting the driving signals to compensate for distortion errors in a potential distribution on the black matrix, and providing the compensated driving signal to the second substrate.

Still further, a third embodiment consistent with the present invention is a position sensible liquid crystal display device using a black matrix as a position sensing means and comprising: a first substrate having a plurality of gate lines, data lines, thin film transistors, and pixels arranged thereon; a second substrate having first and second grids of the black matrix arranged thereon; an amplifying part for amplifying a driving signal that is to be applied to the second substrate; and an amplification gain determining and switching part for dividing signals from the amplifying part into a plurality of voltage levels and selecting one of the plurality of voltage levels, and providing the selected voltage level to the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 4:
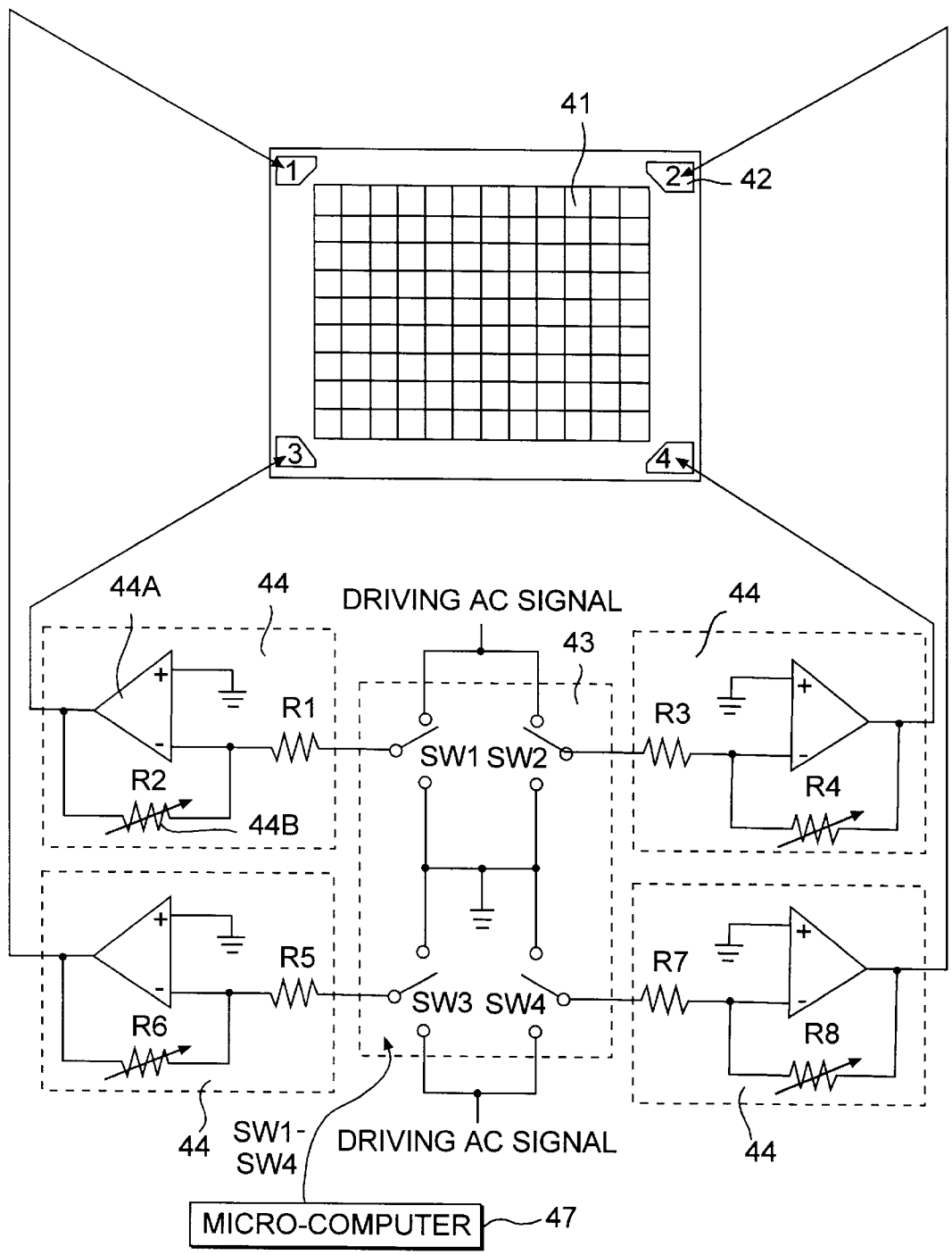
FIG. 4 is a diagram illustrating a PSLCD in accordance with a first preferred embodiment of the present invention.

Reference will now be made in detail to the preferred embodiments of the present invention, examples of which are illustrated in the accompanying drawings. FIG. 4 illustrates a PSLCD in accordance with a first preferred embodiment of the present invention and includes a PSLCD panel 41; driving signal applying area 42 disposed at four corners of the PSLCD panel 41; a switching part 43 for selective application of a driving AC signal or a grounding signal to the driving signal applying areas 42; and signal correcting circuits 44, each for receiving a signal from the switching part 43 and compensating the signal for potential distribution error that may occur in the PSLCD. Each of the signal correcting parts 44 includes an amplifying part 44a, such as an operational amplifier, for receiving and amplifying the driving AC signal or the grounding signal from the switching part 43, and a variable resistor 44b for adjusting a signal fed back to the amplifying part 44a to thereby adjust an amplitude of the signal provided to the driving signal applying areas 42.

The operation of the PSLCD in accordance with a first embodiment of the present invention will now be explained.

Figure 1:
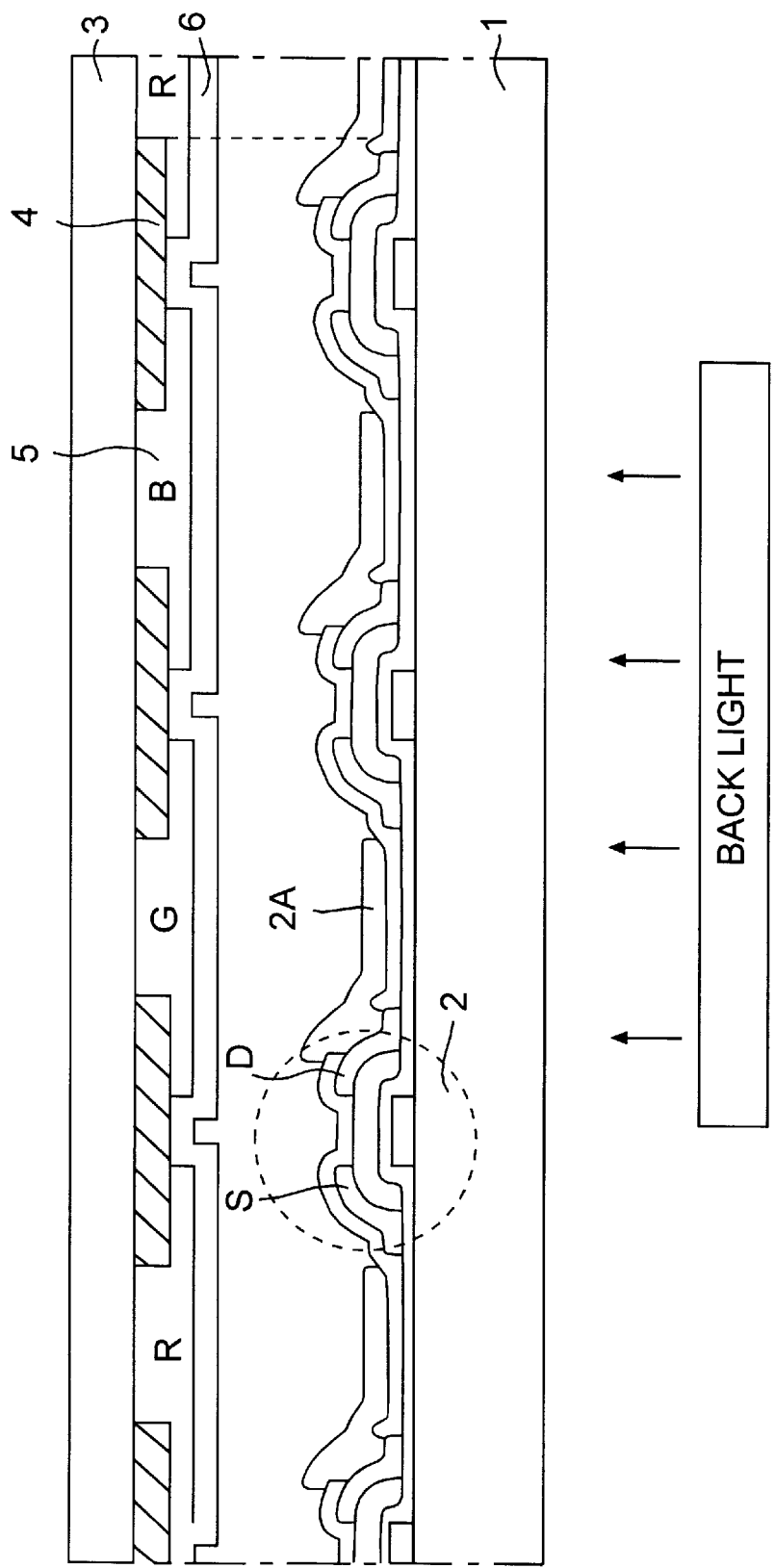
FIG. 1 is a diagram illustrating a section of a liquid crystal display device.
Figure 2:
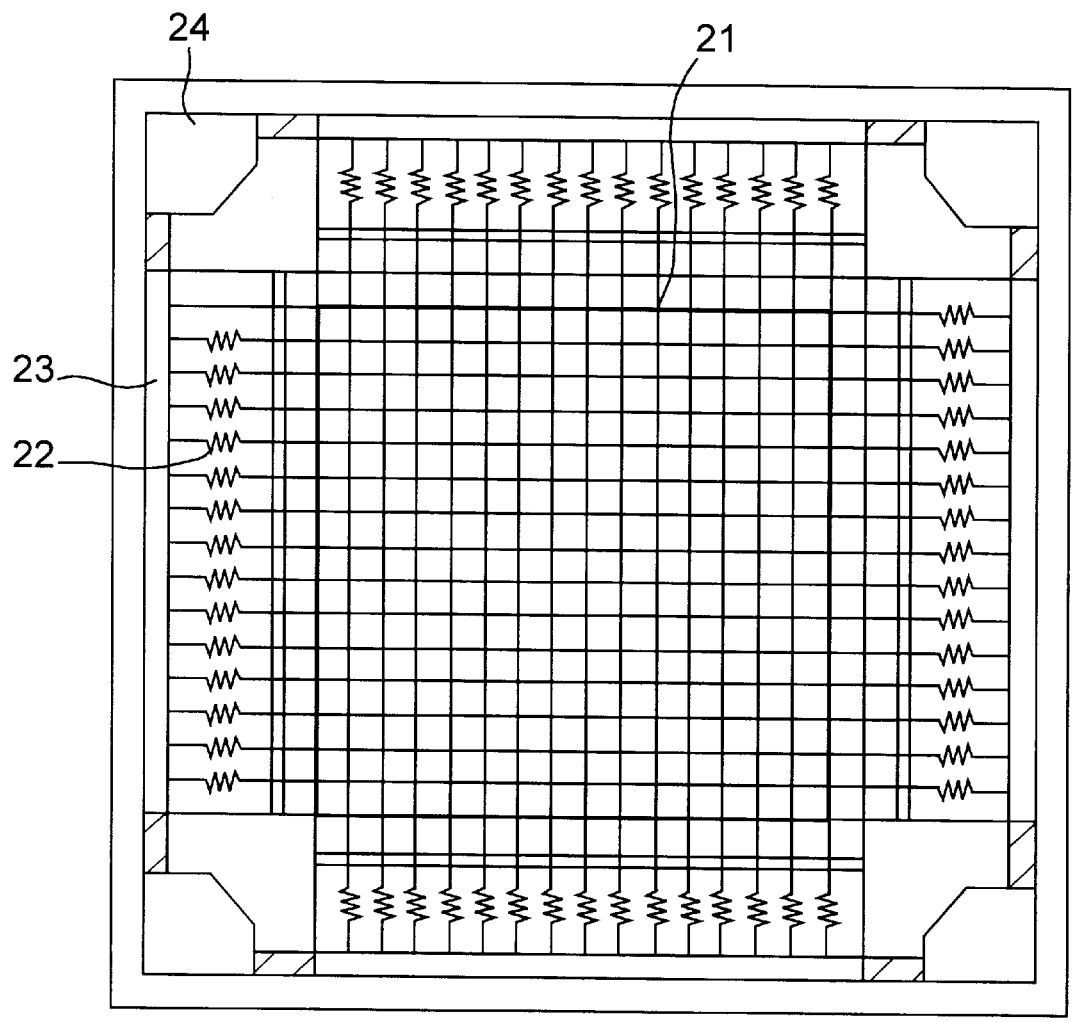
FIG. 2 is a plan view of an upper plate of a conventional PSLCD.
Figure 3:
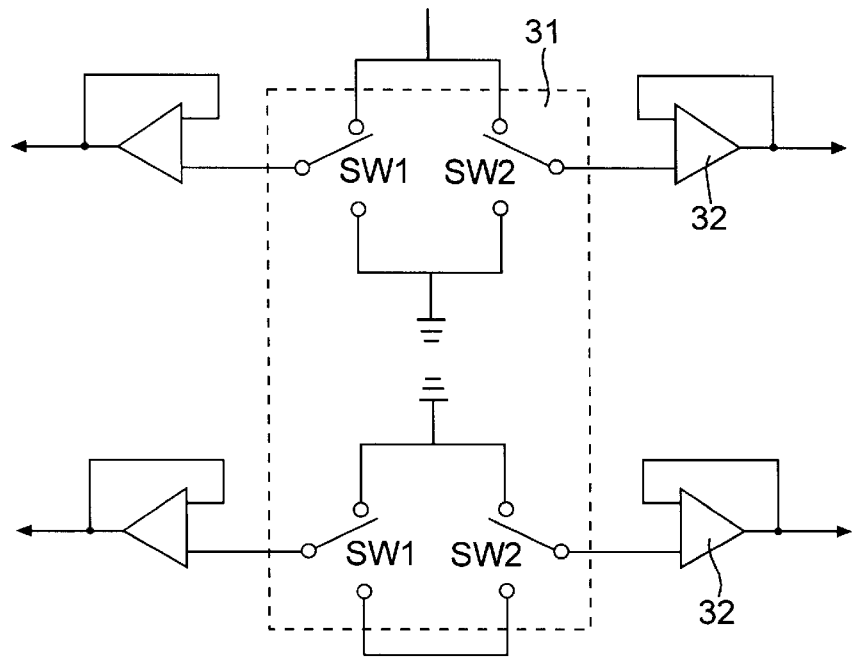
FIG. 3 is a block diagram of a driving signal applying device for applying a driving signal to detect position in a conventional PSLCD device.
Figure 5:
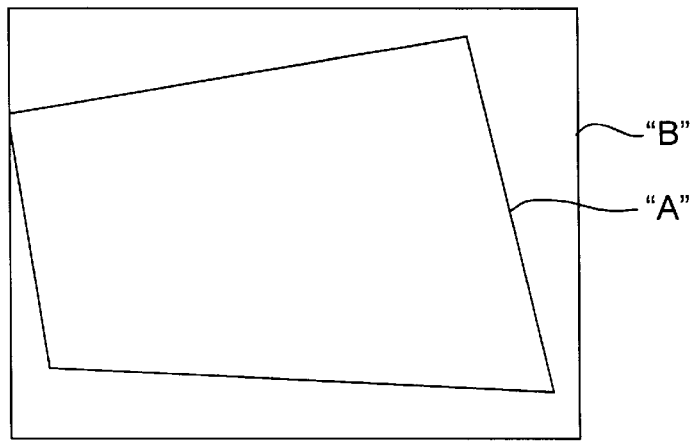
FIG. 5 is an illustration of a potential distribution of the PSLCD in accordance with a first preferred embodiment of the present invention.

Referring to FIG. 4, in order to selectively apply the driving AC signal to driving signal applying area 42-1, 42-2, 42-3 and 42-4, a microcomputer controls switches SW1, SW2, SW3 and SW4 in the switching part 43. Of the four driving signal applying areas 42-1, 42-2, 42-3 and 42-4, two adjacent driving signal applying areas are applied the driving AC signal, and the other two driving signal applying areas are applied the grounding signal. For example, when driving signal applying area 42-1 and 42-2 receive the driving AC signal, driving signal applying areas 42-3 and 42-4 receive the grounding signal. This is accomplished using microcomputer 47 to appropriately control switches SW1 and SW2. According to the switching operation of the switches SW1, SW2, SW3, and SW4 under the control of the microcomputer, either the driving AC signal or the grounding signal is provided to an inversion input terminal on the amplifying part 44a through a resistor R1, R3, R5 or R7 provided on an input terminal of the amplifying part 44a. An output from the amplifying part 44a is fed back to the input terminal on the amplifying part 44a through a variable resistor R2, R4, R6 or R8. Variable resistors R2, R4, R6 and R8 compensate for distortion of potential distribution. That is, resistors R2, R4, R6 and R8 are adjusted, with subsequent adjustment of gains of the amplifying parts 44a, for compensating the distortions in the potential distribution of the driving AC signal. FIG. 5 is a diagram illustrating an exemplary potential distribution curve in the PSLCD shown in FIG. 4. As shown, the conventional asymmetric potential distribution polygon "A" is improved using the device of the present invention to the rectangular potential distribution "B".

Figure 6:
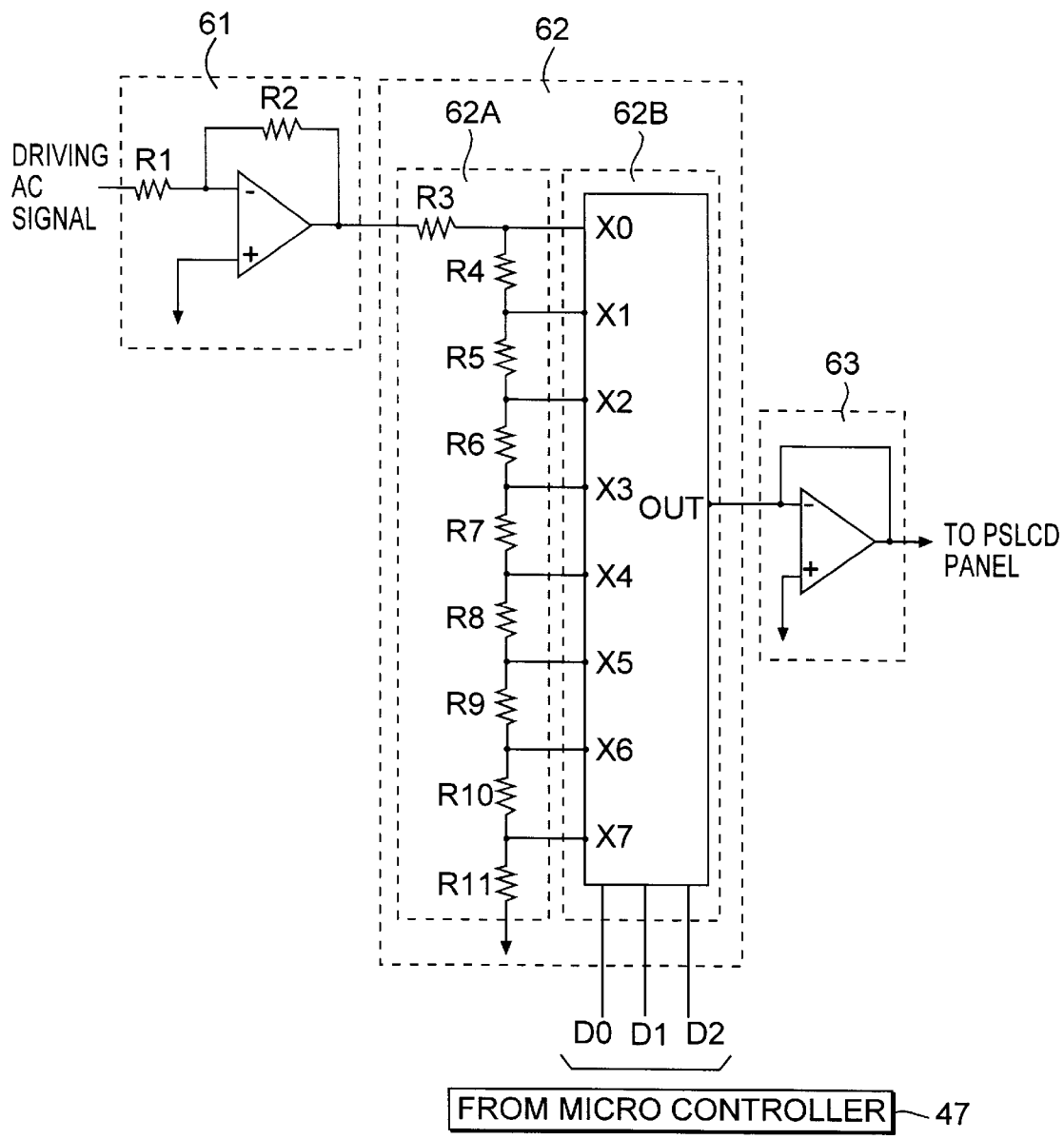
FIG. 6 is an illustration of a system of driving a device for a PSLCD in accordance with a second preferred embodiment of the present invention.

FIG. 6 illustrates a system of a driving device for a PSLCD in accordance with a second preferred embodiment of the present invention.

The second embodiment includes a first amplifying part 61 for amplifying a driving AC signal from a driving AC signal generating part; an amplification gain determining and switching part 62 for receiving the amplified driving AC signal and dividing the amplified driving AC signal into multiple levels; and a second amplifying part 63 for amplifying the output signal from the amplification gain determining and switching part 62. Amplifying part 61 is a pre-amplifier and amplifying part 63 is a voltage follower with approximately unity gain. The amplification gain determining and switching part 62 includes a resistor section 62a containing a plurality of resistors R3–R11. Resistors R3–R11 divide the input AC signal into a plurality of levels, and a switching part 62b selects one of the levels. Preferably, switching part 62b is a multiplexer controlled by microcontroller 47 through selection lines D0, D1, and D2. Alternatively, the multiplexer may be replaced with an analog switch.

The operation of the aforementioned PSLCD in accordance with a second embodiment of the present invention will now be explained.

Referring to FIG. 6, the driving AC signal from the driving AC signal generating part is amplified by an appropriate gain through the first amplifying part 61 and provided to the amplification gain determining and switching part 62. Then, the amplified driving AC signal passes through the initial resistor R3 and is provided to terminal $X_0$ of switching part 62b. The plurality of resistors connected in series between the resistor R3 and terminal $X_7$ divide the amplified driving AC signal into the plurality of levels. Switching part 62b selects one of terminals $X_1$–$X_7$ using control signals D0, D1, and D2 from a microcomputer (not shown) to select the appropriate voltage level.

Figure 7:
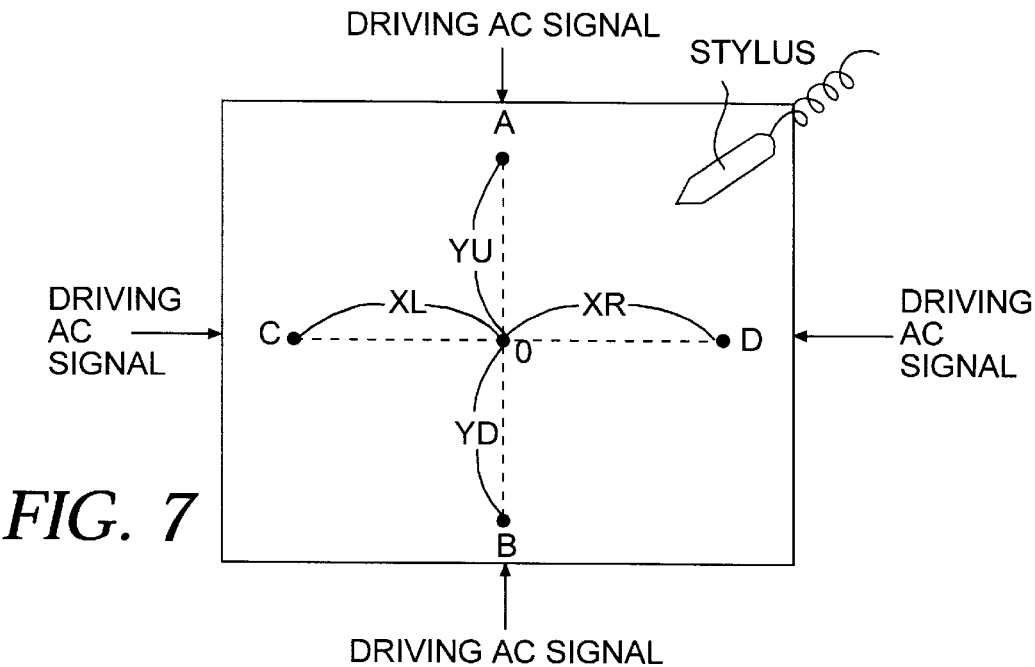
FIG. 7 is an illustration of a PSLCD and a stylus in reference to the second preferred embodiment of the present invention.
Figure 8A:
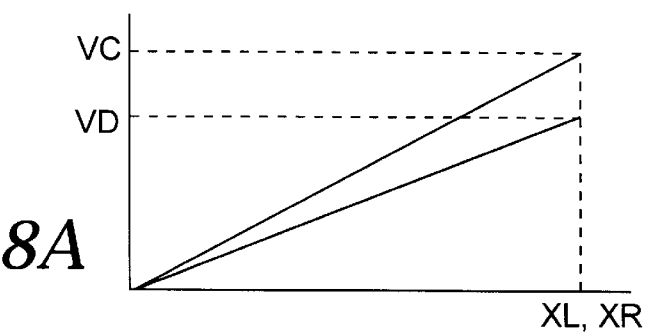
FIGS. 8A and 8B are graphs illustrating differences of voltages in a PSLCD in reference to the second preferred embodiment of the present invention.
Figure 8B:
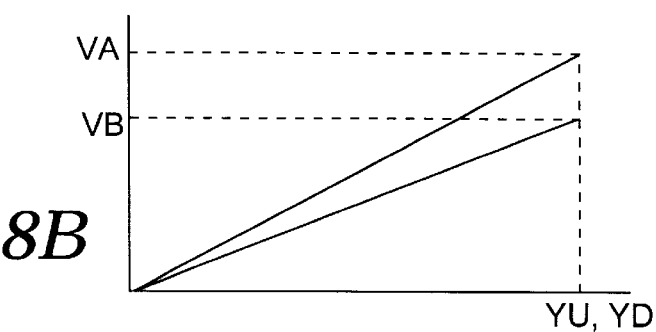

The aforementioned second embodiment of the PSLCD device of the present invention will be explained in more detail with reference to FIG. 7. Assume coordinates of points "a", "b", "c" and "d" on the conventional PSLCD panel are taken with a stylus and the coordinates values (i.e., voltage values taken by the stylus with reference to a central point 0) are as shown in FIG. 8. As shown, the voltage at point "a" is Va, the voltage at point "b" is Vb, the voltage at point "c" is Vc and the voltage at point "d" is Vd. The voltage pairs (Va, Vb) and (Vc, Vd) are not identical. However, with the second embodiment of the present invention, the voltages of Va and Vb, and of Vc and Vd can be compensated to make them identical. In particular, consistent with the present invention, it is assumed that Vc/Vd equals a constant (called alpha). Accordingly, by amplifying Vc and/or Vd based on the amplification factor of terminals $X_0$–$X_7$, from switching part 62b, Vc/Vd can be made equal to one. Then, the voltage selected in response to the control signal is provided to the PSLCD panel through second amplifying part 63. Similarly, amplification factors are selected so that Vb/Va becomes unity. Thus, by adjusting an amplitude of the driving AC signal, i.e., a peak-to-peak voltage in case of a sinusoidal wave, amplitudes of voltages taken by the stylus at points in distances equal from an origin can be compensated to be equal.

Figure 9:
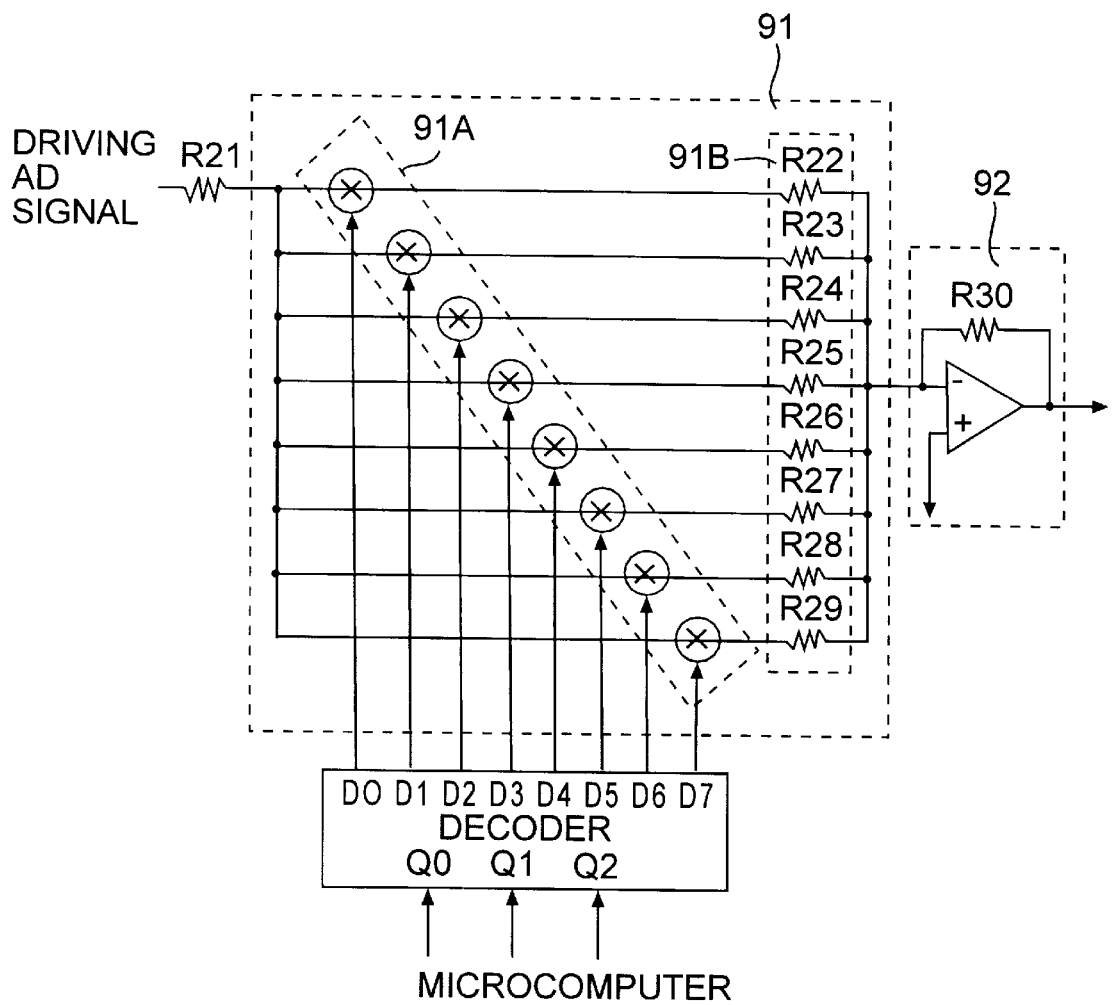
FIG. 9 is a diagram illustrating a system of a PSLCD in accordance with a third preferred embodiment of the present invention.

FIG. 9 illustrates a system of a PSLCD device in accordance with a third preferred embodiment of the present invention. This embodiment is similar to the second embodiment, except that here, selectable amplification gain is provided at a fore end of an amplifier. That is, the third embodiment of the PSLCD device consistent with the present invention includes an amplification gain determining and switching part 91 for providing a driving AC signal only to one of a plurality of resistors $R_{22}$–$R_{29}$ to provide appropriate amplification gain for voltage distortion compensation. In this instance, the amplification gain is $-(R_{30}/R_n)$, where n=22, 23, - - -, 29. The amplification gain determining and switching part 91 includes a switching part 91a having a plurality of analog switches for selectively switching the driving AC signal and resistors 91b respectively connected to the switches for dividing the driving signal provided through the switches to a plurality of levels.

Upon reception of a selecting signal from the microcomputer, the aforementioned third embodiment PSLCD of the present invention selects one analog switch designated by the selecting signal. When the selected switch is turned on, the driving AC signal is provided to the amplifying part 92 through one of the selected resistors 91 connected to the selected switch and therefrom to the PSLCD panel.

As has been explained, the PSLCD of the present invention has a number of advantages. In particular, correction of a driving signal before application to the upper plate prevents the asymmetric distortions of the potential distribution. Additionally, the error in position detection caused by errors in panel fabrication process or other reasons can be eliminated.

It will be apparent to those skilled in the art that various modifications and variations can be made in the position sensible liquid crystal display device of the present invention without departing from the spirit or scope of the invention. Thus, it is intended that the present invention cover the modifications and variations of this invention provided they come within the scope of the appended claims and their equivalents.

What is claimed is:

1. A position sensible liquid crystal display device comprising:
   a microcomputer;
   a first substrate having a plurality of gate lines, data lines, thin film transistors, and pixels arranged thereon;
   a second substrate having a digitizer formed of first and second grids and a signal applying area;
   a switching part under the control of the microcomputer for selecting a driving AC signal and a grounding signal; and
   a signal correcting part connected to the switching part for selecting one level among a plurality of predetermined amplitude levels of the AC signal and for applying the selected one level to the signal applying area to compensate a potential distribution of the digitizer.

2. A device as claimed in claim 1, wherein the signal correcting part corresponds to driving signal applying parts disposed at four corners of the second substrate.

3. A device as claimed in claim 2, wherein the signal correcting part includes:
   an amplifying part for amplifying a signal from the switching part, and
   a variable resistor for adjusting an output value fed back from the amplifying part to adjust an amplitude of the signal provided to the driving signal applying part.

4. A device as recited in claim 1, wherein the signal correcting part includes,
   an amplifying part for amplifying a driving AC signal; and
   an amplification gain determining and selecting switch for dividing the signal from the amplifying part into a plurality of voltage levels, selecting one of the plurality of voltage levels, and providing the selected voltage level to the signal applying part.

5. A device as claimed in claim 1, wherein an amplifier having a gain of unity is provided between the second substrate and the amplification gain determining and selecting switch.

6. A device as claimed in claim 1, wherein the amplification gain determining and selecting switch includes,
   a plurality of resistors for dividing the signals from the amplifying part into a plurality of voltage levels; and
   a multiplexer connected to the resistors for selecting one of the plurality of voltage levels.

7. A device as claimed in claim 1, wherein the amplification gain determining and selecting switch is disposed at a fore end of the amplifying part.

8. A device as claimed in claim 1, wherein the digitizer includes a black matrix of the liquid crystal display.

9. A position sensible display device comprising:
a digitizer of a rectangular shape and having four signal applying areas at corners; and
a driving circuit selectively for applying an AC signal to two adjacent signal applying areas and a grounding signal to the other two signal applying areas, the driving circuit including,
a driving signal generating part for generating a driving AC signal,
a switching part for selecting the driving AC signal and grounding signal, and
a signal correcting part coupled to the switching part for selecting one level among a plurality of predetermined amplitude levels of the AC signal and for applying the selected one level to the applying area to compensate the potential distribution of the digitizer.

10. A device as claimed in claim 9, wherein the signal correcting part includes an operational amplifier having variable resistor on a feed back loop.

11. A device as claimed in claim 9, wherein the signal correcting part includes a resistor string for dividing the driving AC signal into a plurality of levels and selecting switch for selecting one of the plurality of levels.

12. A device as claimed in claim 11, wherein the signal correcting part further includes a pre-amplifier for amplifying the driving AC signal and applying the amplified driving AC signal to the resistor string.

13. A device as claimed in claim 11, wherein the signal correcting part further includes an amplifier having a gain of unity between the selecting switch and the signal applying area.

14. A device as claimed in claim 11, wherein the selecting switch includes a multiplexer.

15. A device as claimed in claim 9, wherein the signal correcting part includes an operational amplifier whose output is coupled to the applying area, a plurality of resistors, and an analog switching part for applying the driving AC signal to the amplifier through one of the plurality of resistors.

16. A device as claimed in claim 9, wherein the digitizer includes a black matrix of a liquid crystal display.

17. A device as claimed in claim 9, wherein the signal correcting part adjusts the driving AC signal so that potential on a first point when an AC signal is applied to a first pair of adjacent signal applying areas and a grounding signal to a second pair of signal applying areas is substantially same as a potential on a second point when an grounding signal is applied to the first pair of adjacent signal applying areas and an AC signal is applied to the other pair of signal applying areas, the first and second points being symmetrical to a center of the digitizer.

* * * * *